Oct. 31, 1972   P. FRIESEN   3,701,561
TRAILER CONSTRUCTION
Filed May 28, 1970   4 Sheets-Sheet 1

Peter Friesen,
Inventor
by Lyle G. Torey,
Agent

Oct. 31, 1972 P. FRIESEN 3,701,561
TRAILER CONSTRUCTION
Filed May 28, 1970  4 Sheets-Sheet 4

Peter Friesen,
Inventor
by Lyle G. Trorey,
Agent

United States Patent Office
3,701,561
Patented Oct. 31, 1972

3,701,561
TRAILER CONSTRUCTION
Peter Friesen, 3627 204th St., Langley,
British Columbia, Canada
Filed May 28, 1970, Ser. No. 41,225
Int. Cl. B60p 3/34
U.S. Cl. 296—27                                    13 Claims

ABSTRACT OF THE DISCLOSURE

A trailer including a box and a roof, the trailer adapted to be towed behind a vehicle in a closed condition with the roof adjacent the box. The roof is adapted to be raised by a crossed four-bar mechanism, the roof forming one of the bars and an opposite bar being effectively of variable length, variation in length accomplished by cable actuated slide mechanism at bases of roof supporting corner posts. Undesirable roof tilt prevented by lengths of cable or links secured to the corner posts and the box, or by canvas acting as guylines.

BACKGROUND OF THE INVENTION

Field of the invention

The invention relates to a two wheeled trailer adapted to be towed behind an automotive vehicle. The trailer has a box and a roof which, when the trailer being towed, is in a lowered position covering the box. Upon reaching a campsite, the roof is raised and the trailer converted into a shelter.

Prior art

Trailers of this kind are well known. U.S. Pat. 3,323,778 issued to Baker in 1967 teaches a particularly ingenious elevating means for raising the roof of a trailer. This is a cable actuated mechanism of extensible sections. U.S. Pat. 3,145,046 issued to Orn et al. in 1964 is a collapsible type construction of a telescopic type cabin, with raising and lowering being effected by cable means. U.S. Pat. 2,188,545 issued to Smelker in 1940 teaches still another collapsible trailer body construction, extensible both longitudinally and vertically. This invention too uses cable means to effect collapsing and extension of the trailer.

More sophisticated equipments use manual or power hydraulic means to raise and lower an upper portion or, in some cases, to expand the trailer laterally, and longitudinally as well.

Many hundreds of thousands of trailers are in use, nearly all give satisfactory and indeed often excellent service. The present invention is directed generally to provide simple robust mechanism minimally free of mechanical complexities so as to be characterized by reliability and ease of maintenance.

OUTLINE OF THE INVENTION

A trailer according to the present invention has a simple rectangular relatively shallow box with a top, or roof, covering the box and releasably secured thereto for travelling. Raising of the roof is accomplished by two crossed four-bar mechanisms, one at the front and one at the back of the trailer. In an extended position of the four-bar mechanism the roof is raised to a suitable height with the initially crossed bars then extending vertically from each corner of the box, supporting four corners of the roof. Crossed four-bar mechanism has been used above to describe linkage used to raise and lower the roof, in actuality the linkage is a four-bar mechanism only instantaneously, since one link of the mechanism has a length which varies, variation of the length of this link, which instantaneously is a fixed link of the mechanism, effects raising and lowering of the roof. Lower ends of the crossed members, which are crossed only at certain positions, are secured in cable clamps having one degree of freedom, namely translation only, with respect to horizontal tracks of each mechanism the tracks being secured to a base of the box across each end. Cables secured to the cable clamps effect the alteration in length so as to move the bars from a lowered crossed position to an upper position at which, as explained above, the bars are vertical supporting corners of the roof at the raised position.

Instantaneously, or considering the motion to be arrested at a position intermediate between the raised and lowered positions of the roof, we have a crossed four-bar mechanism as aforesaid, with a fixed link secured to the base of the box. Consequently, being a four-bar mechanism partial closure or limiting of rotation of the crossed members, is required for, otherwise, the roof could tilt transversely so as to impede raising or lowering. This might be particularly troublesome for instance in a high wind. It is well known to restrain an upper end of one of the crossed members hinged to a corner of the roof to travel vertically in a straight line. This solution is not practical in the present use of the mechanism nor is it necessary.

Were an upper end so restrained, a mid-point of the member would have a circular locus centered at an intersection of the fixed link produced and the vertical line, i.e. at the corner of the box. Consequently, the same restraint could be effected by a rigid fifth link extending from the mid-point to the centre of the locus. Since there are two crossed links in the mechanism, equivalent restraint can be effected by two flexible links, that is to say cables, for the single rigid fifth link above. The latter solution, a means to limit tilting of the roof described in detail hereinbelow, does not require critical fitting and jointing, and is simple to construct, install and maintain providing a nice restraint, and is essentially frictionless. It has been found in practice to be trouble free.

Other means of effecting closure to limit roof tilt are also disclosed.

Since this is a two-wheeled trailer, means are provided to level the platform in a fore and aft direction, and to secure it in that position when unhitched from the vehicle.

A detail disclosure following, related to drawings, describes and illustrates embodiments of the invention together with related structure not generally discussed above. The detail description is given by way of example, the invention being capable of expression in structure and mechanism other than that particularly described and illustrated.

DETAIL DESCRIPTION

Figure 1:
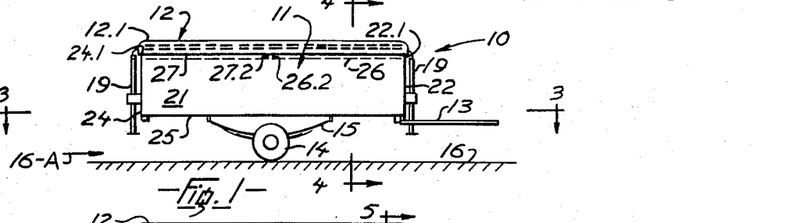
FIG. 1 is a simplified side elevation of a trailer according to the invention, the trailer being shown packed ready for towing (i.e. in a roof lowered position)
Figure 2:
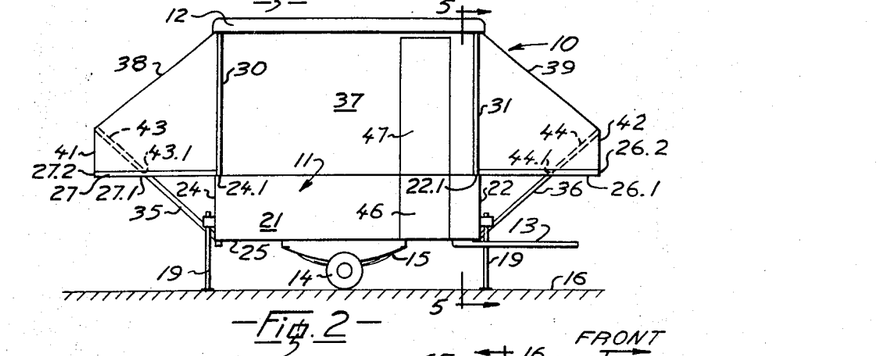
FIG. 2 is a simplified side elevation of a trailer according to the invention, the trailer being shown ready for use (i.e. in a roof raised position)

FIG. 1, with reference being made to FIG. 2

A trailer 10 according to the invention has a relatively shallow rectangular box 11 and roof 12, the roof having an upper surface 12.1. A tow bar 13 is adapted to be secured to a rear end of a towing vehicle not shown, the trailer having ground wheels 14 journalled on a transverse axle secured to a suspension 15. The trailer is shown ready for towing along a road 16 in a (forward) direction indicated by an arrow 16-A. Front and rear roof holding and leg means 19 are shown in a raised position securing the roof onto the box, in this position the legs are retracted. The box has right hand and left hand sides 21 and 23, front and rear ends 22 and 24, the side 21 only being seen in FIGS. 1 and 2, and a base 25. Right and left hand designations apply to the trailer as viewed looking forward. The front and rear ends 22 and 24 have upper edges 22.1 and 24.1 adjacent to which are hinged front and rear platforms 26 and 27 the platforms having surfaces 26.1 and 27.1 (FIG. 2) and edges 26.2 and 27.2, and are shown in broken outline inside the box 11.

The roof 12 in the lowered position shown in FIG. 1, rests against the upper edges of the front and rear ends and against upper edges of the sides of the box releasably secured by the means 19, as later described with particular reference to FIG. 12.

FIG. 2

In FIG. 2 the trailer 10 is shown with the roof 12 raised above the box 11 supported by front and rear corner posts 31 and 30 in the roof raised position. A front corner post 32 and a remaining rear corner post, not shown, are provided, the roof 12 being supported at four corners. The four posts extend vertically from positions adjacent inner corners of the box, corners being defined at intersections of the sides and ends, and are adapted to be moved upwards from the base 25 of the box by means including a cable and slide arrangement later described. The platforms 26 and 27 are shown in an extended position and are supported in a generally horizontal attitude by extensible struts 35 and 36 hinged to the surfaces 26.1 and 27.1 of the platforms 26 and 27, the struts being releasably secured to the ends 24 and 22 of the box. The struts have a length which can be varied, and means are provided to vary the length so as to serve as means to level the platforms, independently of the box. Thus the platforms, which serve as beds, can be levelled irrespectively of tilt of the box about the axle.

The holding and leg means 19 are shown in a lowered position serving as legs to provide longitudinal support when the tow bar is unhitched from the vehicle. In the lowered position, the means 19 are released from the roof 12 before it is raised to a position spaced upwards from the box 11. A vertical canvas side 37 extends from the raised roof 12 to the box 11 extending to the edges 26.2 and 27.2 of the platforms 26 and 27, and sloping canvas roofs 38 and 39 extend from the raised roof 12, to vertical canvas walls 41 and 42. The canvas walls 41 and 42 are supported by U-shaped frame members 43 and 44, the members 43 and 44 each being hinged at outer ends 43.1 and 44.1 to the platforms 26 and 27, and held in sleeves sewn in the canvas roofs, and for clarity are not shown in detail in FIG. 2. In this embodiment, the canvas side 37 and canvas walls 41 and 42 are secured permanently to the platforms 26 and 27 as is later explained. The side 21 has a hinged door 46 and a canvas access flap 47.

Figure 3:
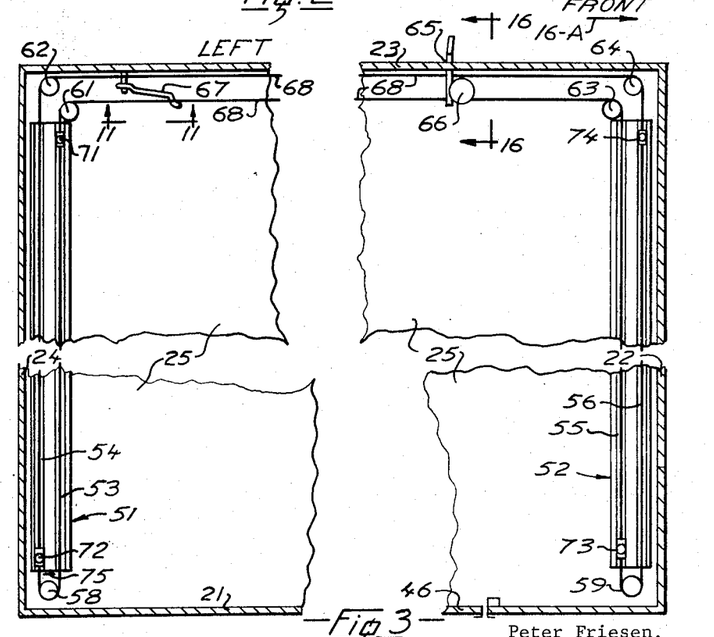
FIG. 3 is a fragmented section on 3—3, FIG. 1, portions pertaining only to a box being shown and corner posts being removed.

FIG. 3, with references being made to FIGS. 7, 8, 9, 11, and 16

Figure 8:
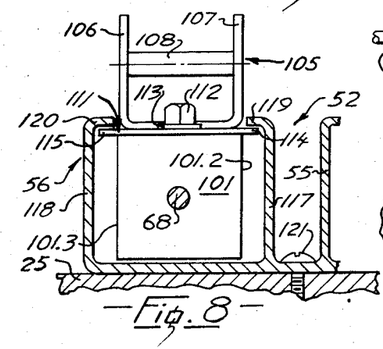
FIG. 8 is a fragmented end elevation as seen from 8—8, FIG. 7, a portion of a base being shown and a portion of a corner post being omitted.

As seen in FIG. 3, rear and front guide rails 51 and 52 are secured to the base 25 adjacent and parallel to the ends 24 and 22 respectively. Each guide rail is provided with two tracks, the guide rail 51 having first and second tracks 54 and 53 and the guide rail 52 having first and second tracks 55 and 56 (FIG. 8). Right hand pulleys 58 and 59 are provided at right hand ends of the guide rails 51 and 52 respectively. Left hand pulleys 61 and 62 are provided at a left hand end of the guide rail 51 and left hand pulleys 63 and 64 at a left hand end of the guide rail 52. The pulleys are aligned with respective tracks in the guide rails to accept a cable 68 in the tracks. A winding drum 66, FIG. 9, having a turning means 65 to turn or wind the drum, FIG. 16, means 67, FIG. 11, to tension the cable being provided between the pulleys 63 and 61.

The cable 68 has two ends referred to as inner and outer, the inner end is secured to one end of the drum 66 (FIG. 9) with the cable passing around the pulley 63 along the track 55, around the pulley 59 and returning in the tracks 56 to the pulley 64. From the pulley 64 the cable passes clear of the drum 66 to the pulley 62, along the track 54, around the pulley 58 returning in the track 53 to the pulley 61 through the cable tensioner 67 and, several turns of cable being wound around the drum, the outer end of the cable is secured to an opposite end of the winding drum 66. The drum 66 and tensioner 67 are described later. The winding drum is rotated by the means 65 and, because the cable is wound around the drum, the drum serves as a means to translate the cable, the cable being effectively endless, ends being effectively joined at the drum 66.

Each track is provided with a cable clamp (FIG. 7) secured to the cable and free to slide within the track. The tracks 53 and 54 have cable clamps 71 and 72 respectively, and the tracks 55 and 56 have cable clamps 73 and 74 respectively. Each clamp is secured to the cable 68 in a position on the cable so that the two clamps of a particular guide rail are at opposite ends of the guide rail when in a position shown in FIG. 3. The winding drum has sufficient turns of cable wound around it so that rotation of the drum in one direction feeds one end portion of the cable off the drum and the other end portion onto the drum, so translating the cable and with it the clamps from one end of the tracks to the other, the cable clamps thus passing each other at an approximate mid-point of the tracks. A stop 75 is provided at one end of the rail 51 to prevent the clamps sliding out of the rails. This also serves as a stop for the cable, thus stops for remaining ends of the rails are not provided.

Figure 4:
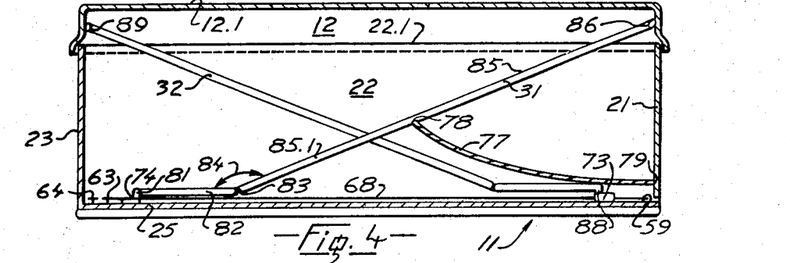
FIG. 4 is a simplified section on 4—4, FIG. 1, guide rails and some other parts being omitted.
Figure 5:
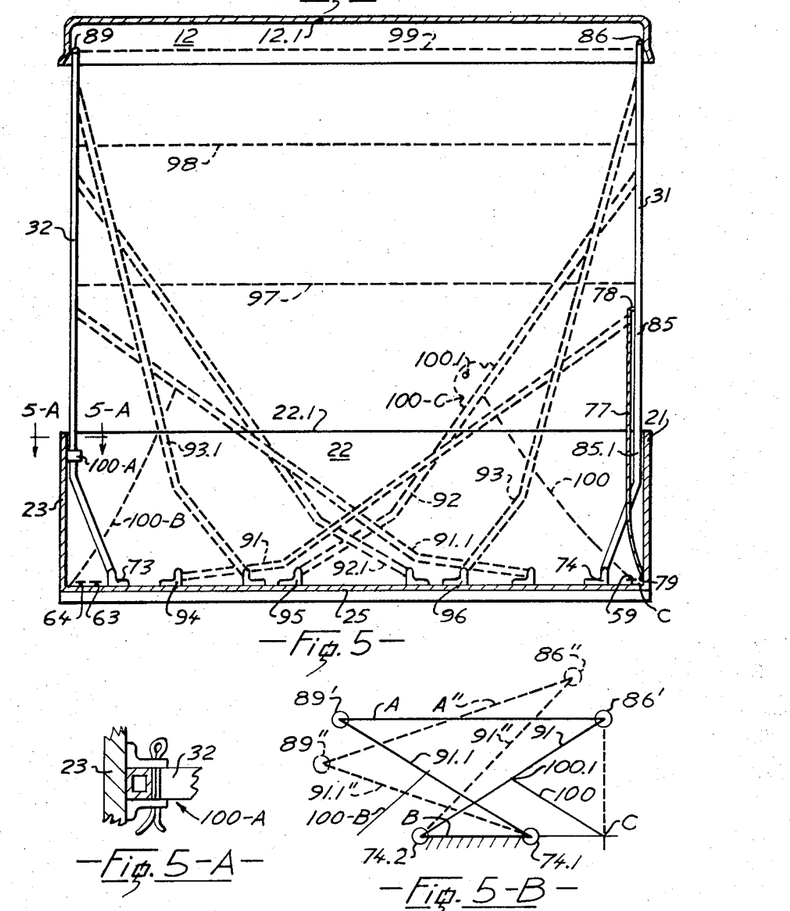
FIG. 5 is a simplified section on 5—5, FIG. 2, guide rails and some other parts being omitted, with intermediate positions of corner posts between the roof raised and roof lowered positions shown in broken outline, FIG. 5–A is a detail fragmented section on 5–A—5–A, FIG. 4, showing means for releasably securing a corner post, FIG. 5–B is a kinematic diagram illustrating the crossed four-bar mechanism seen in FIG. 5.
Figure 7:
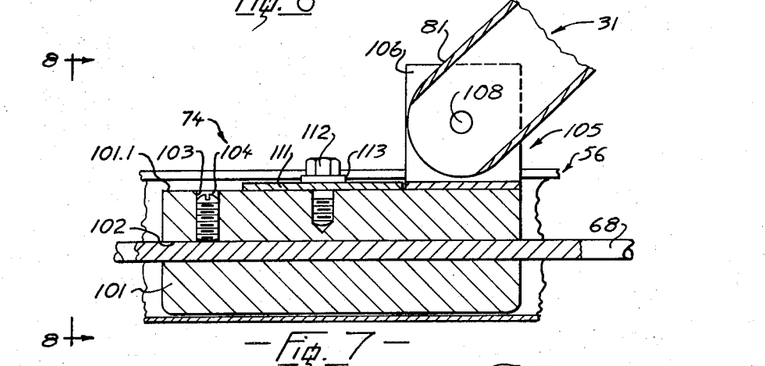
FIG. 7 is a simplified section on 7—7, FIG. 6, portions of the track being omitted for clarity.

FIG. 4, with references being made to
FIGS. 3, 5 and 7

A portion of the cable 68 is secured to the clamp 74, and a parallel portion of the cable is secured to the clamp 73, one portion of cable only being shown, the portions passing around the pulleys 64, 63, and 59, as shown in FIG. 3. The posts 31 and 32 are hinged respectively to the clamps 74 and 73, FIG. 7, the posts being shown in a lowered position, which is attained when the roof 12 is in the lowered position.

The front corner post 31 is square section steel tubing, and has a lower end 81 hinged to the cable clamp 74 by a pin, FIG. 7. A lower portion 82 of the post 31 is bent at 83 as shown at an angle 84 to an upper portion 85, which angle is in the order of one hundred and sixty degrees depending on spacing of the roof 12 above the base 25, height of the ends 22 and 24 above the base 25, and width of the base 25. The portion 85 has a lower end 85.1, later described with reference to FIG. 5. An upper end 86 of the portion 85 is hinged to a front corner lug on the roof 12. The front corner post 32 being a second front corner post is similarly hinged at a lower end 88, and an upper end 89 to a second front corner lug at an opposite front corner of the roof.

A length of restraining cable 77 has one end secured to the post 31 at a central position 78 with an opposite end to the side 21 at a position 79, the cable being of such length as to permit the post 31 to be raised vertically, as shown in FIG. 5. The positions 78 and 79 and the length of the cable 77 are such as to permit the post 31 to be lowered or raised, a similar restraining cable (not shown) is secured to the post 32 and the side 23. As later explained with particular reference to FIG. 5-B, the cables provide means to limit tilt of the roof as it is being raised or lowered, as is later explained in detail.

Figures 12, 13, 14, 15, 16, 17, 18:
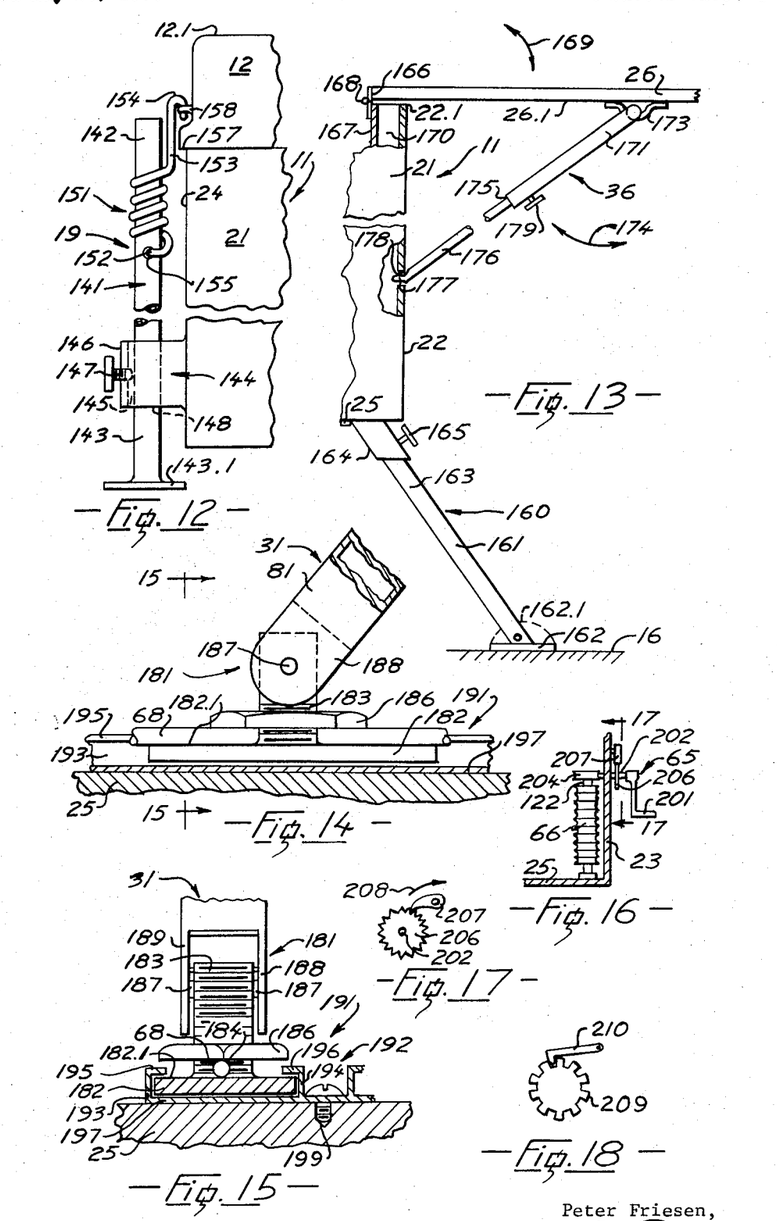
FIG. 12 is a simplified fragmented side elevation of a portion of the trailer showing roof holding and leg means.
FIG. 13 is a simplified fragmented side elevation of a portion of a trailer in the roof raised position, showing supports for a platform and alternative leg means.
FIG. 14 is a simplified fragmented side elevation of an alternative cable clamp in a track with portions of the track removed.
FIG. 15 is a simplified fragmented section on 15—15, FIG. 14.
FIG. 16 is a simplified fragmented section of means to rotate and secure the winding drum, as seen from 16—16, FIG. 3.
FIG. 17 is a simplified fragmented view of a means to secure the winding drum against rotation, as seen from 17—17, FIG. 16.
FIG. 18 is an alternative means to secure the winding drum against rotation.

FIG. 5, with references being made to
FIGS. 1, 13, and 17

In FIG. 5, the roof 12 is shown in a raised position with the upper surface 12.1 parallel to the base 25. Means for raising the roof from the lowered position to a raised position supported above the box are described below. To raise the roof, each cable clamp is caused to move from one end of its track to the other by translation of the cable, intermediate positions of the clamp 74 being shown in broken outline at 94, 95, 96. Corresponding successive intermediate positions of the corner post 31 when raising the roof are shown in broken outline at 91, 92, 93, and corresponding intermediate positions of the surface 12.1 are shown in broken outline at 97, 98, and 99. Successive positions of corner post 31 are described below, the corner post 32 simultaneously moving through successive broken outline positions 91.1, 92.1, 93.1. The front corner post 30 and the opposite front corner post move similarly.

On raising the roof, the cable clamp 74 is moved to the position 94 by rotating the drum, moving the post 31 to the intermediate position 91 and the upper surface 12.1 to the position 97. On further rotation of the drum raising of the roof continues, the cable clamp 74 moving to the position 95 and the post 31 moves to the position 92 and the surface 12.1 to the position 98. When the cable clamp 74 is in the position 96, the post is in the position 93 and the surface 12.1 is in the position 99. In an extreme position, i.e. roof fully raised, when the cable clamp 74 is in an extreme right hand position being designated here as 74, the upper portion 85 of the post 31 is vertical, the roof 12 is at its maximum height, and the lower end 85.1 of the portion 85 is adjacent and parallel to the side 21 of the box 11. Pawl means not shown in FIG. 5 and described with respect to FIG. 17, lock the drum so that the roof remains raised. The pawl can be used to lock the roof in an intermediate position—this facilitates packing of the canvas sides and roofs as the roof is being lowered—particularly when windy. The corner posts move in a space provided between the end 22 and an inner end of the box 11, as described with particular reference to FIG. 13.

In the intermediate positions aforesaid, the roof, the corner posts and the base form a crossed four-bar mechanism so that the roof is free to tilt, hence the restraining cable 77 is provided to act as a means to limit tilt of the roof as it is being raised or lowered. The cable is shown in broken outline at 100 in intermediate position associated, the post 31 being in the position 92. Without the cable 77 and a corresponding restraining cable secured to the post 32 as shown at 100–B associated with the post position 91.1 the roof would tilt.

The crossed four-bar mechanism and the tilt limiting means above are further discussed below with reference to a kinematic diagram, FIG. 5–B, together with a rigid link effecting the same restraint.

A second means to limit tilting of the roof whilst it is being raised or lowered is provided by the sloping canvas roofs 38 and 39. The platforms are inside the box 11 when the roof 12 is being raised or lowered, and the canvas roofs 38 and 39 become taut and limit tilting movement of the roof 12. Either or both restraining means can be used, except as described below.

In some trailers, the platforms 26 and 27 are too long to be folded as shown in FIG. 1, i.e. the edges 26.1 and 27.1 overlap at a midpoint of the trailer. In such cases the canvas walls and sides are releasably secured to the platforms instead of being permanently secured, so that there then would be no restraining effect as above.

FIG. 5–A

FIG. 5–A shows a simple cotter pin means 100–A releasably securing the corner post 32 to the side 23 of the box when the roof is fully raised, each corner post can have a similar securing means. Releasable toggle clamp means, not shown, and other well known devices serve equally well.

FIG. 5–B

FIG. 5–B is a kinematic diagram illustrating the crossed four-bar mechanism seen in FIG. 5. The corner post members are shown in positions generally corresponding to the positions 91 and 91.1, FIG. 5, these members, links of the four-bar mechanism, being represented in FIG. 5–B by solid line centerlines. The upper end of the link 91 is designated 86′, and the upper end of the link 91.1 is designated 89′, the upper ends, being hinged to opposite front corners of the roof. A roof portion between 89′ and 86′ is designated A. Corresponding positions of the cable clamps are designated 74.1 and 74.2 with, considering the mechanism at rest in the position described, a fixed link B of the mechanism defined between 74.2 and 74.1 as described above, it is clear that 86′ can travel in a circular path to 86″, when 89′ would travel in a circular path to 89″, with the crossed links then being in a position shown in broken outline and designated respectively 91″ and 91.1″, the link B remaining of fixed length as postulated. And the link A has now assumed a tilted position A″ as shown. With the cable 100 provided as shown in full outline at 100, the link 91 cannot swing as above, consequently, tilting of the roof is limited. A cable 100–B secured to the link 91.1 similarly limits opposite tilt of the (roof) link A.

To recapitulate, it is seen that front corner posts 31 and 32 in the positions 91 and 91.1, a front portion of the roof between the front roof corners to which the upper ends are hinged which portion is designated A in the position shown, and the portion of the guide rails between the cable clamps designated B define a crossed four-bar mechanism, the front posts being, as aforesaid, of such length that when the roof is in a lowered position the posts lie within the box adjacent to the front portion with the cable clamps adjacent front corners of the box—a second similar four-bar mechanism being defined by corresponding back elements.

Point of attachment of the cable 100 to the link 91 is designated 100.1, if 86′ be (by any means) constrained to travel in a straight line 86′-C, C being an intersection of the fixed link B produced therewith, with B and 86′-C at right angles and 100.1 being equidistant from 74.2 and 86′, then as 74.2 moves along a line 74.2-C with 86′ moving along the line 86′-C, then 100.1 describes a circular locus centered at C, C being a box corner. Thus if the link 100 is a rigid link pin jointed at 100.1 and at C, required straight line restraint is attained and roof (link A) tilting is prevented—as well the link 100-B, a flexible link viz a cable, is not required.

Referring now to FIG. 5, the post 32 is bent at its lower end as has been described, consequently 100.1, FIG. 5-B, does not lie in the post. Hence with a rigid link embodiment a bracket 100-C is provided so that 100.1 is positioned as described with reference to FIG. 5-B.

For proper operation of the rigid link embodiment, accurate fabrication and fitting is required to effect proper operation, thus the flexible cable limiting means is simpler to fabricate, install and maintain that the rigid link limiting means. While the roof raising and lowering mechanism is operative without the tilt limiting above, optimum results are attained with a limiting means.

Figure 6:
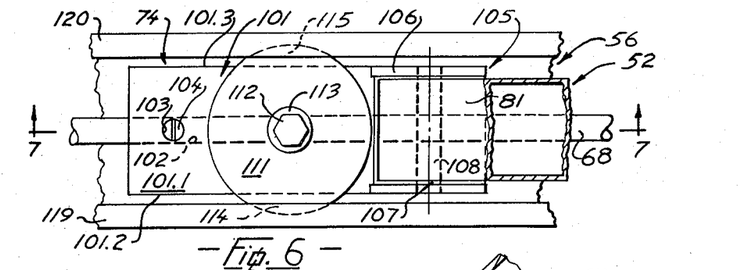
FIG. 6 is a fragmented top plan of a cable clamp and a portion of a track and cable.

FIGS. 6, 7 and 8

The clamp 74 has a rectangular block 101 having an upper surface 101.1 and vertical side surfaces 101.2 and 101.3, the block having a central bore 102 parallel to the side surfaces, the bore being adapted to accept the cable 68. A threaded bore 103 communicates with the central bore 102 and a screw 104 within the bore 103 secures the cable to the cable clamp. A bifurcated bracket 105, having two vertical flanges 106 and 107 is secured to the upper surface 101.1 of the block 101. Aligned passages through the flanges accept a pin 108, which pin is secured horizontally in the aligned passages and supports the lower end 81 of the post 31. The end 81 is freely hinged, permitting limited rotation of the post 31 about the pin 108.

A circular flat washer 111 is secured to the upper surface 101.1 by a bolt 112, the bolt being secured against rotation by a locking washer 113. As is seen in FIG. 8, diametrically opposed segments of the washer 111 designated 114 and 115 extend beyond the vertical side surfaces 101.2 and 101.3 of the rectangular block. The clamp is within the track 56 of the guide rail 52, the track being defined in part by two vertical side elements 117 and 118, the side elements having upper horizontal flanges 119 and 120 respectively, which project inward into the track 56 and extend over the segments 114 and 115. Thus the segments 114 and 115 of the washer in combination with the flanges 119 and 120 serve as a means to restrain the cable clamp within the track whilst it slides along the track, translation being within the track. The guide rail limited to one degree of freedom of motion relative to the track, translation being within the track. The guide rail 52 is secured to the base 25 of the box 11 by a plurality of screws as 121, FIG. 8.

Figure 9:
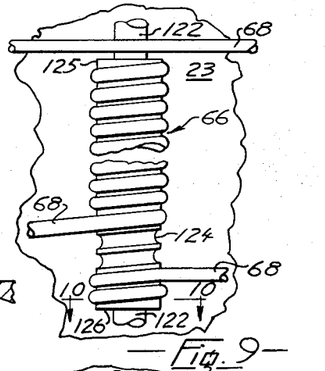
FIG. 9 is a fragmented simplified side elevation of a winding drum with end portions of the cable.

FIG. 9

The winding drum 66 is secured to a shaft 122 which is obviously journalled for rotation in the base 25 and an upper bearing (not shown). Means to rotate the shaft 122 are provided, e.g. a worm gear (FIG. 16) with external provision for rotating the worm gear, and with it the shaft 122. The winding drum has a periphery having a helical groove 124 of semi-cylindrical section as shown to accept the cable 68. The drum 66 has an upper end 125 and a lower end 126 to which are secured opposite ends of the cable 68. Other manual means or electrical means (not shown) can be provided to rotate the shaft 122.

Figure 10:
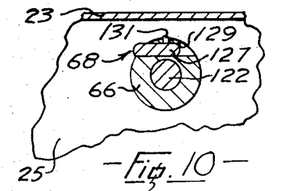
FIG. 10 is a simplified section on 10—10, FIG. 9, showing means of securing the cable to the drum.

FIG. 10, with reference being made to FIG. 9

In FIG. 10 the inner end of the cable 68 is shown secured at 127 to the end 126 of the drum. A passage 129 is provided in the end 126 of the drum, extending from an outside helical groove and passing chord-wise through the drum. A set screw 131 in a threaded bore projects radially from the periphery of the drum into the passage 129 securing the inner end of the cable. The outer end of the cable is similarly secured to the end 125 of the drum 66.

Figure 11:
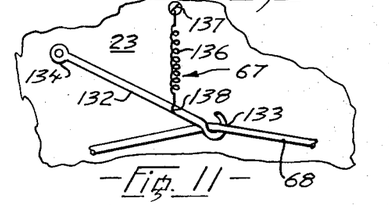
FIG. 11 is a fragmented simplified side elevation of a cable tensioning means as seen from 11—11, FIG. 3.

FIG. 11

The means 67 to tension the cable has an arm 132 having an upper end 134, and having a hook 133 at a lower end. The upper end 134 is hinged to the side 23 permitting rotation of the arm, and the hook 133 accepts a portion of the cable 68 extending from the pulley 61 to the drum 66. A tension spring 136 has an upper end 137 secured to the side 23 of the box and a lower end 138 secured to the arm 132, providing force on the arm 132 to maintain tension in the cable 68. The cable 68 is thus urged continually upwards taking in slack which occurs during raising and lowering of the roof 12.

FIG. 12

The roof holding and leg means 19 includes a vertical tubular leg 141 having an upper end 142 and a lower end 143. The leg is slidable in a bracket 144 secured to the rear end 24 of the box 11, and a lower end of the leg has a flat ground bearing plate 143.1. The bracket 144 has a passage 145 to accept the leg 141, and an outer wall 146 having a threaded bore for a hand screw 147. When the hand screw 147 is partially unscrewed the leg 141 is a sliding fit in the passage 145, but when the hand screw is tightened the leg is secured in a desired position against an inboard side wall of the passage 145, the side wall being shown in broken outline and designated 148.

A coil spring 151 having a lower end 152 and an upper end 153, encircles the leg 141, a downward pointing hook 154 being provided at the upper end. A radial passage 155 in the leg 141 accepts the lower end 152 restraining rotation of the spring 151 and locating it axially on the leg 141. The roof 12 has a lower edge 157 to which is secured an eye 158 adjacent the lower edge, the eye 158 being adapted to receive the hook 154, which hook, when urged downwardly into the eye, restrains upward movement of the roof. Other means adapted to receive the hook 154 can be used.

To hold the roof 12 on to the box 11, the hand screw 147 is unscrewed releasing the leg 141, and the coil spring 151 is extended by hooking the hook 154 into the eye 158 and sliding the leg 141 through the bracket 144. When the spring is extended sufficiently the leg 141 is locked in position by tightening the hand screw 147. Means releasably securing the roof in the lowered position against the box are thus effected by the roof holding and leg means 19.

To release the roof and lower the leg getting the trailer ready for camping, the hand screw 147 is unscrewed permitting the leg 141 to slide upwards, releasing tension in the coil spring 151 and permitting the hook 154 to be raised and rotated to withdraw the hook from the eye 158. The leg is then slid downwards through the bracket 144, the hook 154 clearing the roof 12, until the plate 143.1 contacts the ground. When the base of the box is level fore and aft the hand screw 147 is tightened, and a similar leg at an opposite end of the trailer is similarly extended, notwithstanding grade and surface irregularities, the trailer is then supported by the two wheels 14 and the means 19 with the base of the box level in a fore and aft direction.

Alternative means (FIG. 13) to level the base as aforesaid can be used, in which case the plate 143.1 at the end 143 of the leg 141 is omitted, or other roof holding means can be later described can be used.

FIG. 13

Alternatively to the means 19 above, leg means 160 can be used to level the trailer and common spring-loaded hood catches as used on automobiles, not shown, can be used as roof holding means.

As seen in FIG. 13 the leg 160 has an inner leg element 161 having a bearing plate 162 at a lower end, the plate is adapted to be substantially horizontal when the box is horizontal. An upper end 163 of the element 161 is a sliding fit within a tube 164 secured to the base 25 of the box. A hand screw 165 is provided in a threaded bore (not shown) in the tube 164. The base 25 is levelled and maintained level by loosening the hand screw 165, sliding the leg 161 until the plate 162 contacts the ground with the box 11 horizontal, then tightening the screw 165. Clearance is provided within the box permitting the element 161 to be retracted when the trailer is being towed. The leg 161 can be universally mounted in a bracket 162.1 shown in broken outline, so as to provide better bearing on a sloping surface.

The extensible support 36 has a U-shaped outer tube 171 having a straight inner portion (not shown), the straight inner portion being hinged onto the surface 26.1 of the platform 26 by straps 173. This permits rotation of the tube 171 in directions shown by an arrow 174. Open ends of the U-shaped tube, one being designated 175, accept an inner tube element 176 which is a sliding fit within the tube 171. A lower end of the tube element 171 has a tapered end portion 177 which is adapted to fit in a hole 178 within the front end 22 of the box, the portion 177 and hole 178 providing means to releasably secure the struts 35 and 36 to the ends 24 and 22.

A hand screw 179 is provided in a threaded bore in a lower end of the tube 171, permitting the element 176 to be locked to the tube 171. When the end 177 is fitted in the hole 178 and the platform 26 is level, the platform is maintained level by tightening the hand screw 179 locking the element 176 to the tube 171.

The platform 26 has an inner edge 166 which, in the position shown in FIG. 13, is adjacent an inner front end 167 of the box 11. A hinge 168 secures the platform 26 to the end 167 permitting limited rotation of the platform about the end 167 in a direction shown by an arrow 169. The inner front end 167 is spaced from the front end 22 by a distance 170, which distance provides clearance permitting the two corner posts to move between the ends 22 and 167 during raising and lowering of the roof 12 when the platform 26 is folded inside the box. The ends 167 and 22 provide a partial support for the posts during raising or lowering of the roof 12, as will be later explained.

FIGS. 14 and 15

An alternative cable clamp designated 181 has a rectangular plate 182 having an upper surface 182.1, to which is secured a projecting stud 183, the plate having a longitudinal axis, not shown. A passage 184 is provided at a base of the stud 183, the passage being aligned with the longitudinal axis of the plate 182 and having a lower wall aligned with the surface 182.1.

When a portion of the cable 68 is passed through the passage 184, a circumferential portion is in contact with the surface 182.1. A nut 186 is screwed on the stud 183 and, when tightened, the nut clamps the cable onto the plate 182, thus securing the cable to the cable clamp.

The end of the post 31 is bifurcated providing ends 188 and 189 which are journalled on a pin 187, ends of which project from the stud 183. The post 31 has provision for limited rotation about the pin 187, rotation occurring when raising or lowering the roof 12.

A modified guide rail 191 is provided for use with this alternative cable clamp. The guide rail has two tracks, a track 192 only being shown which track is partially defined by two relatively short vertical side walls 193 and 194. The short side walls 193 and 194 have inwardly inclined, horizontal flanges 195 and 196, which flanges overhang outer edges of the plate 182 so as to retain the plate within the track 192. The plate 182 rests on a horizontal base portion 197 of the guide rail 191, which horizontal portion extends between the parallel tracks, screws used to secure the guide rail 191 to the base 25 designated 199.

FIGS. 16, 17 and 18

In FIG. 16 the means 65 to wind the drum 66 includes a crank handle 201 releasably secured on a shaft 202 journalled in the left hand side 23 of the box. A worm gear (not shown) at an inner end of the shaft 202 drives a worm wheel 204 secured on the shaft 122 of the winding drum 66. Rotation of the crank handle 201 rotates the drum 66 which provides a means of translating the cable 68, not shown in FIG. 16.

A star wheel 206 is secured to the shaft 202 and a pawl 207 is hinged to the side 23, the pawl being adapted to be rotated into engagement with the star wheel 206 to lock it against rotation. As seen in FIG. 17, rotation of the pawl in a direction shown by an arrow 208 releases the pawl from engagement with the star wheel, rotation of the shaft 202 raising or lowering the roof. The pawl 207 can be spring urged into engagement with the star wheel 206 or, as shown in FIG. 18, weight of a hinged pawl 210 can be sufficient to urge it into recesses in a square toothed wheel 209, an alternative means to secure the drum against rotation.

OPERATION

With the trailer in the roof lowered position, as towed behind the vehicle, on arrival at a suitable site the means 19 are released from the roof by unscrewing the hand screw 147 to release the hook 154 (FIG. 12) from the eye 158 and lowering the leg 141 until the plate 143.1 contacts the ground. When the trailer is level, the hand screw 147 is locked. All the means 19 are extended and locked in this manner. The trailer can be unhitched from the vehicle and the crank handle 201 (FIG. 16) is fitted to the shaft 202 and the pawl 207 is released from the star wheel 206, by rotating the pawl in the direction shown by the arrow 208, cranking of the handle rotates the winding drum 66 and, as the drum rotates, the cable clamps slide along the tracks to opposite ends, the corner posts moving as described with reference to FIG. 5. When the roof 12 has reached its maximum height, the crank handle is held in this position whilst the pawl 207 moves into engagement with the star wheel 206 to lock the roof in the raised position (FIG. 17). When the roof is so locked, the cotter means 100-A, FIG. 5-A, provides additional locking. Tilting of the roof occurring during raising is limited as described above.

The platforms 26 and 27 are rotated outwards from inside the box 11 to the position shown in FIG. 2. The extensible support 36 is rotated from the surface 26.1 to a position shown in FIG. 13 in which the tapered end 177 is fitted in a hole 178 in the side 22 of the box 11. The hand screw 179 is tightened when the platform 26 is horizontal. This procedure is repeated for the platform 27. The U-shaped frame members 43 and 44 are positioned providing relatively taut sloping canvas roofs 38 and 39. The trailer is now ready for use.

To lower the roof reverse procedure is followed, the extensible supports 36 and 35 are released permitting the platforms 26 and 27 to be folded inside the box 11, care being taken to fold the canvas side 37 and the sloping canvas roofs 38 and 39 to fit within the box. Load is applied to the crank handle 201 for the pawl 207 to be rotated out of engagement with the star wheel 206, when opposite rotation of the crank lowers the roof 12. Whilst the roof is being lowered, the canvas side and roofs carry load due to weight of the platforms 26 and 27, and as the roof descends the platforms are lowered to a level position in the box. When the roof has been lowered, the vehicle is hitched to the tow bar 13 and the means 19 are raised after releasing the hand screw 146. The roof 12 is secured to the box 11 by securing the hook 154 into eye 158 on the roof 12 and pushing the leg 141 downwards, thus extending the spring 151. The hand screw 147 is retightened when sufficient extension of the spring is attained, providing resilient roof holding means.

I claim:

1. A trailer including, a rectangular box (11) having a base, sides, and ends, corners being defined at intersections of the sides and ends, a transverse axle having ground wheels, a tow bar adapted to be secured to a towing vehicle, the box having a roof; in combination with the foregoing,
   (a) means (19) releasably securing the roof in a lowered position against the box,
   (b) means (19, 160) to level the base of the box supporting it in a fore and aft direction.
   (c) means for raising the roof from the lowered position to a raised position supported above the box, and for lowering the roof to the lowered position, the means including:
      (i) a first front corner post (31) having an upper end (86) hinged to a front corner of the roof, a second front corner post (32) similarly hinged to an opposite front corner of the roof, and similarly disposed rear corner posts each post having a lower end, the posts being adapted for supporting the roof at each of four corners thereof,
      (ii) a rear guide rail (51) and a front guide rail (52) secured to the base adjacent and parallel respectively to the ends of the box, each guide rail having first and second tracks (55, 56),
      (iii) each track having a cable clamp (71–74), the clamp having one degree of freedom of motion relative to the track being capable only of motion of translation within the track,
      (iv) the lower end of the first front corner post being hinged to the cable clamp of the first track of the front guide rail, the lower end of the second front corner post being hinged to the cable clamp of the second track of the same guide rail, the rear corner posts being similarly connected to rear corners of the roof and to cable clamps of the tracks of the rear guide rail, constructed and arranged so that, when the roof is in the lowered position; the front corner posts, a front portion of the roof between the front roof corners to which the upper ends are hinged, and a portion of the guide rail between the cable clamps, instantaneously define links of a crossed four-bar mechanism, the front posts being of such length that the posts lie within the box adjacent to the front in a crossed position with the cable clamps adjacent opposite front corners of the box; a second similar crossed four-bar mechanism being defined by the back corner posts, a corresponding back portion of the roof, and a corresponding rear guide rail portion; and when the roof is in the raised position, the posts are substantially parallel to each other and the roof is substantially parallel to the base,
      (v) means to effect motion of translation of the cable clamps as aforesaid, raising the roof from the lowered position to the raised position and for lowering the roof to the lowered position,
   (d) means (206, 207), releasably securing the roof in the raised position.

2. A trailer according to claim 1, and
   (vi) means to limit tilting of the roof while it is being raised, the means last aforesaid also limiting tilting of the roof while it is being lowered.

3. A trailer according to claim 2, wherein the means to effect motion of translation of the cable clamps includes an effectively endless cable and means to effect translation of the cable, the clamps being secured to the cable.

4. A trailer according to claim 3, wherein translation of the cable is effected by winding drum means (66).

5. A trailer according to claim 3, and means (67) to tension the cable.

6. A trailer according to claim 3, and a stop (75) at one end of one rail to prevent the clamps from sliding out of the rails.

7. A trailer according to claim 3, wherein the means to limit tilting of the roof as aforesaid includes a cable having one end secured to a midpoint of a corner post link of the four-bar mechanism, and having an opposite end secured adjacent to an end of the track in which the cable clamp to which the lower end of the aforesaid post is hinged, the said end of the track being vertically below the upper end of the aforesaid post.

8. A trailer according to claim 3, wherein the means to limit tilting of the roof as aforesaid includes a rigid link pin jointed at a point of a corner post link on a straight line joining points about which the post is hinged, and equally distant from each said point, an opposite end of the rigid link being pin jointed to the box adjacent to an end of the track in which the cable clamp to which the lower end of the aforesaid post is hinged, the said end of the track being vertically below the upper end of the aforesaid post.

9. A trailer according to claim 1, wherein a cable clamp includes a rectangular block having an upper surface and vertical side surfaces, the block having a central bore parallel to the side surfaces and being adapted to accept the cable, means to secure the cable in the bore, and means to hinge a lower end of the post to the cable clamp.

10. A trailer according to claim 1, wherein a cable clamp has a rectangular plate having an upper surface to which a projecting stud is secured, the plate having a longitudinal axis; a passage at a base of the stud, the passage being aligned with the longitudinal axis and having a lower wall aligned with the upper surface, a lower end of the post being bifurcated providing ends which are journalled on a pin ends of which project from the stud so that the post is hinged to the cable clamp.

11. A trailer according to claim 3, wherein the means to limit tilting of the roof as aforesaid includes in combination
   (a) a platform (26), having an edge (26.2) and an inner edge (166), the inner edge hinged to an inner end (167) of the box (11),
   (b) a sloping canvas roof (39) secured to the roof (12) and the edge (26.2),
the combination constructed and arranged so that, when the platform (26) is inside the box (11), and the roof (12) is raised or lowered, the canvas roof (39) becomes taut limiting movement of the roof.

12. A trailer according to claim 11, in which the sloping canvas roof (39) extends to a vertical canvas wall (42), the wall (42) being secured to the edge (26.2) and supported by a U-shaped frame member (44), the frame member being hinged at outer ends (44.1) to the platform (26) and held in sleeves sewn in the roof (39), constructed and arranged so that when the platform (26) is inside the box (11), and the roof (12) is raised or lowered, the canvas roof (39) becomes taut limiting movement of the roof.

13. A trailer including, a rectangular box (11) having a base, sides, and ends, corners being defined at intersections of the sides and ends, a transverse axle having ground wheels, a tow bar adapted to be secured to a towing vehicle, the box having a roof; in combination with the foregoing,

13

(a) means (19) releasably securing the roof in a lowered position against the box, the means including:
a tubular leg having an upper end and a lower end, the tube being slidable in a bracket secured to a rear end of the box, a lower end of the leg having a ground bearing plate, the bracket having a passage to accept the leg and means releasably to secure the leg in the bracket, a coil spring encircling the leg adjacent the upper end, a lower end of the coil spring being secured in the leg, the spring having a hooked upper end adapted to engage an eye of the roof so that sliding the leg downwards within the bracket with the hook engaging the lug tensions the spring securing the roof to the box, the hook being released from the eye to permit the roof to be released; with the roof being released, sliding of the bar within the bracket, with the bearing plate on the ground, provides means to support the box levelling it in a fore and aft direction,

14

(b) means (19, 160) to level the base of the box supporting it in a fore and aft direction,
(c) means for raising the roof from the lowered position to a raised position supported above the box, and for lowering the roof to the lowered position,
(d) means (206, 207), releasably securing the roof in the raised position.

References Cited
UNITED STATES PATENTS

| 3,194,251 | 7/1965 | Pettersen | 52—66 X |
| 3,367,708 | 2/1968 | Brown | 296—27 |
| 3,161,433 | 12/1964 | Markel | 296—27 |

PHILIP GOODMAN, Primary Examiner

U.S. Cl. X.R.

52—66